Patented Mar. 6, 1951

2,544,336

UNITED STATES PATENT OFFICE 2,544,336

WELD COMPOSITION

George E. Linnert, Baltimore, Md., assignor to Armco Steel Corporation, a corporation of Ohio No Drawing. Application May 2, 1949,
Serial No. 91,013

3 Claims. (Cl. 75—128)

This invention relates to stainless steel, and more particularly to weld rods for producing deposits of the steel, and to welded joints and products.

An object of my invention is the provision of a highly corrosion-resistant stainless steel, having durability in such environments as those where nitric acid is present and substantial inertness from the standpoint of carbide precipitation and intergranular corrosion is required.

Another object of this invention is the provision of weld rods, as in the form of electrodes, having well-balanced quantities of welding ingredients for use in the production of highly corrosion-resistant stainless steel weld deposits.

A further object of my invention is that of providing weld rods which are capable of depositing highly corrosion-resistant stainless steel weld metal of extra low carbon content having substantial freedom from sigma phase upon cooling and during use of a resulting welded joint or product.

Another object of the present invention is the provision of strong, durable and corrosion-resistant stainless steel weld deposits which are substantially free of carbide precipitation and sigma phase.

Other objects of my invention in part will be obvious and in part pointed out hereinafter.

The invention, accordingly, consists in the combination of elements, composition of materials, and features of products, articles and the like, as described herein, the scope of the application of which is indicated in the claims at the end of this specification.

As conducive to a clearer understanding of certain features of my invention, it may be noted at this point that a variety of weld rods which are capable of depositing stainless steel when heated, have heretofore been employed for the production of welds. All stainless steel welds, of course, afford an appreciable amount of corrosion-resistance, nevertheless some of the deposits heretofore obtained possess inferior resistance in this respect as compared with other stainless steel welds having a different alloy content. In seeking to provide stainless steel welds having outstanding corrosion-resistance, however, one or more properties, such as strength, often suffer unduly through the use of a modified composition.

Experience with certain stainless steel welds, for example, shows that even through the weld metal apparently has good resistance to corrosion, carbide precipitation and intergranular corrosion set in, thus destroying chemical inertness and physical strength. Even some of the steels which are substantially free of carbide precipitation and intergranular corrosion are susceptible to other forms of corrosion, such as that occurring by reason of the presence of sigma phase. The corrosion resistance of sigma phase is quite poor in certain media, as for example in nitric acid.

The sigma phase is a non-magnetic intermetallic compound which frequently forms in certain types of steels during cooling from high temperature, such as from the temperature of depositing a weld. A prolonged maintenance of these welds at high temperature, or their slow cooling as from depositing temperature, often tends to bring out the phase more fully. Especially is this noticed in the austenitic stainless steels of extra low carbon grade. When sigma phase develops, the welds suffer a loss of corrosion resistance. They are relatively brittle in the cold condition and may have cracks. Also, the welds tend to be weak because of sigma phase when hot.

Some of the weld rods heretofore used give an austenitic stainless steel weld deposit which, upon cooling to lower temperatures, becomes martensitic. These deposits in particular are likely to crack, as a result of stresses introduced in the root passes while the weld is being produced. This, of course, lowers the actual strength of the weld and gives a defective joint. There are certain ferritic stainless steel weld deposits, for example, which avoid cracking, one reason for this being that they are not quench-hardenable and thus, as well as in other ways, distinguish from martensitic steel welds. Sigma phase development though usually attaches in the ferritic stainless steel welds. The welds, accordingly, are susceptible to corrosion under certain conditions, such as when used around nitric acid, and often introduce other problems which are closely related to the phase.

An outstanding object of my invention, accordingly, is the provision of strong and durable stainless steel welds which are resistant to cracking, are substantially free of sigma phase, are highly resistant to corrosion in such environments as where nitric acid is present, and are particularly suited to the fabrication of a variety of products and apparatus from austenitic stainless steel plate, sheet, strip, rod, wire and the like of extra low carbon grade.

Referring now more particularly to the practice of my invention, I provide durable and reliable welds in the high alloy steels, particularly the austenitic chromium-nickel molybdenum steels of extra low carbon contents (for example, 10–35% chromium, 5–30% nickel, 0.5% to 8% molybdenum, carbon content not exceeding 0.03% and remainder iron) by depositing a certain fused extremely low-carbon chromium-nickel-molybdenum stainless steel to give the weld. The filler or weld deposit, in having a critically balanced alloy content is substantially free of sigma phase and is highly resistant to corrosion. The filler metal is substantially wholly austenitic and remains so after cooling for example to room temperature. Delta ferrite, if present at all, is only in small quantities. There is substantially no carbide precipitation or intergranular corrosion for the very small amount of carbon present remains approximately all in solution.

As a matter of convenience, and because of losses in the welding operations and other variables, I define the composition of the weld rod or filler material herein in terms of the resulting weld deposit which I achieve. Thus, for forming the weld, I employ a source of the deposited steel, such as a weld rod or electrode, which is capable of yielding by thermal fusion a steel containing carbon in amounts up to about 0.03%, from about 16% to 21% chromium, 10% to 20.5% nickel, 1.75% to 4% molybdenum, and the remainder substantially all iron. The electrode or other source of the steel deposited, moreover, importantly is capable of supplying the chromium, nickel and molybdenum contents so that the deposited steel contains these in critical proportion represented by $$\frac{\text{Per cent Cr} + 2 \times \text{Per cent Mo}}{\text{Per cent Ni}} = \text{a numerical value not exceeding about 1.50}$$

The resulting stainless steel weld deposits which I achieve are very resistant to corrosion and this resistance is all the more effective for the steel is substantially free of sigma phase and carbide precipitation. Certain amounts of sulphur and phosphorus usually exist in the steel and I find that by keeping the quantity of each of these elements below about 0.02%, improved resistance to cracking along the root passes or weld beads is had, and freedom from hot-shortness is better assured for the weld. The small quantities of sulphur and phosphorus each under 0.02%, such as would be yielded by a weld rod in producing the weld, accordingly are preferred. I also prefer to keep the amount of silicon in the deposit below about 0.75%. Among other possible elements in the welds which I achieve is manganese, this element, for example, being in any quantity up to about 2.50% or even more if desired.

I find too, that stainless steels having a composition of the character indicated are highly resistant to corrosion under such conditions as being exposed to nitric acid, this being particularly so in view of the substantial freedom from sigma phase which is quite susceptible to attack. Because of the favorable resistance to corrosion or other good properties, I often provide the steel in some other form than in the form of welds, as, for example, sheets, strip, rods, bars, wire, or the like, which are illustratively useful for making fabricated products. Among these products are vats, tanks, tubes, or other chemical equipment which are very durable in the presence of vapors, liquids or other materials containing nitric acid. In certain instances, I weld sheets of the chromium-nickel-molybdenum steel by depositing filler metal having substantially the same composition. There are occasions too where I draw the steel into seamless tubes or fabricate the tubes from sheet or strip by welding the seam.

Among the preferred substantially wholly austenitic stainless steel compositions in accordance with my invention are those which more particularly contain up to about 0.03% carbon, from 16% to 21% chromium, 14.8% to 19% nickel, 1.75% to 3% molybdenum, and the remainder substantially all iron. In this instance, I find that by restricting the ratio between chromium and nickel $$\frac{(\text{Per cent Cr})}{\text{Per cent Ni}}$$

to a numerical value not exceeding about 1.15 very excellent properties including substantial freedom from sigma phase is had. Manganese usually is present in the steel in quantities ranging up to about 2.50%. The elements sulphur and phosphorus each are preferably less than about 0.02%. Silicon usually amounts to about 0.75% at the most.

Another preferred substantially wholly austenitic stainless steel composition in accordance with my invention is one which contains carbon in amounts up to about 0.03%, approximately 18% to 21% chromium, from 17.2% to 20.5% nickel, 3% to 4% molybdenum, and the remainder substantially all iron. In order to control sigma phase and achieve valuable properties of the metal in this instance, the ratio between the chromium and nickel contents $$\frac{(\text{Per cent Cr})}{\text{Per cent Ni}}$$

is represented by a numerical value not exceeding about 1.05. The steel has a manganese content which does not exceed about 2.50%, and contains silicon in amounts up to approximately 0.75%. Sulphur and phosphorus are each less than about 0.02%.

The use of welding electrodes, such as arc welding electrodes, is preferred for achieving the weld deposits which I provide. One of these electrodes, for example, includes a wire or bar core and a coating which usually together contain the weld metal ingredients. For the sake of simplicity and economy of production, the iron and nickel constitutents, and most if not all of the chromium, preferably are in alloy form in the core. In this connection, the core sometimes comprises stainless steel wire. The elements sulphur, phosphorus and silicon are kept below maximum limits additively in the core and in the coating so as not to be excessive in the weld. Where any appreciable amount of manganese is to be deposited, I find it cheaper to provide at least a portion of the manganese in alloy with other ingredients of the core, and any remainder in the coating. The molybdenum constituent frequently is introduced to the weld from the coating, but all or part may be in the core if desired. My electrode preferably includes a suitable welding flux such as a flux binder for the rest of the coating material. In use, the electrode is fused onto the parent metal which is to be welded, as by operation of arc welding equipment. The metal deposited is the extremely low-carbon austenitic chromium-nickel-molybdenum stainless steel hereinbefore described. Should excessive losses of certain elements intended for the weld be apt to occur in melting down the electrode, this is readily compensated by the use of somewhat larger amounts of the particular components in the rod. Thus, a very exact control over the ingredients entering the weld is readily assured to obtain a weld having a desired composition.

In forming bead deposits, as with electrodes of the character indicated, I find that the weld metal has good resistance to cracking as along the root passes. Upon completion and in use, my welds are strong and ductile, and are resistant to cracking both in the body of the deposit and interfacially with the parent metal. The corrosion-resistance is excellent.

Thus, it will be seen that in this invention there is provided an extremely low-carbon chromium-nickel-molybdenum stainless steel, weld rods for depositing the steel, welds containing the steel, and welded products, in which the various objects noted herein together with many thoroughly practical advantages are successfully achieved. It will also be seen that the steel has a well-balanced content for preventing sigma phase development and intergranular corrosion and otherwise has good properties for many and various uses.

As many possible embodiments may be made of my invention and as many changes may be made in the embodiments hereinbefore set forth, it will be understood that all matter described herein is to be interpreted as illustrative and not as a limitation.

I claim:

1. In a welded article or product, an austenitic chromium-nickel stainless steel weld deposit of low carbon content which is substantially free of sigma phase and carbide precipitation and containing, in approximate percentages, carbon up to 0.03%, 16% to 21% chromium, 10% to 20.5% nickel, 1.75% to 4% molybdenum, sulphur and phosphorus each not exceeding 0.02%, and the remainder substantially all iron, said chromium, molybdenum and nickel further being in accord with $$\frac{\text{Per cent Cr} + 2 \times \text{Per cent Mo}}{\text{Per cent Ni}} = \text{a numerical value not exceeding about 1.50}$$

2. In a welded article or product, an austenitic chromium-nickel stainless steel weld deposit of low carbon content which is substantially free of sigma phase and carbide precipitation and containing, in approximate percentages, carbon up to 0.03%, 16% to 21% chromium, 14.8% to 19% nickel, 1.75% to 3% molybdenum, manganese up to 2.5%, silicon up to 0.75%, sulphur and phosphorus each not exceeding 0.02%, and the remainder substantially all iron, said chromium and nickel further being in accord with $$\frac{\text{Per cent Cr}}{\text{Per cent Ni}} = \text{a numerical value not exceeding about 1.15}$$

3. In a welded article or product, an austenitic chromium-nickel stainless steel weld deposit of low carbon content which is substantially free of sigma phase and carbide precipitation and containing, in approximate percentages, carbon up to 0.03%, 18% to 21% chromium, from 17.2% to 20.5% nickel, 3% to 4% molybdenum, manganese up to 2.5%, silicon up to 0.75%, sulphur and phosphorus each not exceeding 0.02%, and the remainder substantially all iron, said chromium and nickel further being in accord with $$\frac{\text{Per cent Cr}}{\text{Per cent Ni}} = \text{a numerical value not exceeding about 1.05}$$

GEORGE E. LINNERT.

REFERENCES CITED

The following references are of record in the file of this patent:

UNITED STATES PATENTS

| Number | Name | Date |
| --- | --- | --- |
| 1,762,483 | Norwood | June 10, 1930 |
| 2,067,631 | Becket | Jan. 12, 1937 |
| 2,156,307 | Rapatz | May 2, 1939 |
| 2,159,725 | Franks | May 23, 1939 |
| 2,448,462 | Renzoni | Aug. 31, 1948 |
| 2,455,073 | Loveless | Nov. 30, 1948 |

OTHER REFERENCES

The Effect of Molybdenum and Columbium on the Structure, Physical Properties, and Corrosion Resistance of Austenitic Stainless Steels, pages 6 and 7. By Franks, Binder, and Bishop. Paper presented at convention of the American Society for Metals, Cleveland, Ohio, Ocotober 21 to 25, 1940. Published by Electro Metallurgical Corp., N. Y.

Resistance to Sensitization of Austenitic Chromium-Nickel Steels of .03% Maximum Carbon Content, pages 32 to 37. Paper No. 25, presented by Binder, Brown, and Franks at the 30th Annual Convention of the American Society for Metals at Philadelphia, Pa., October 25 to 29, 1948.